United States Patent Office 3,579,645
Patented May 25, 1971

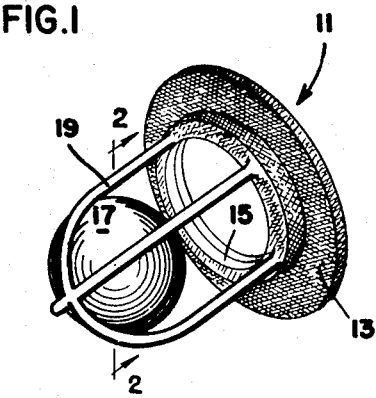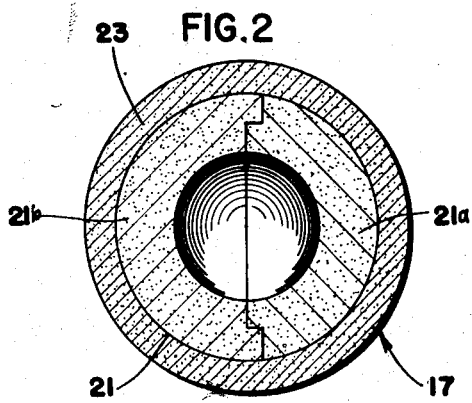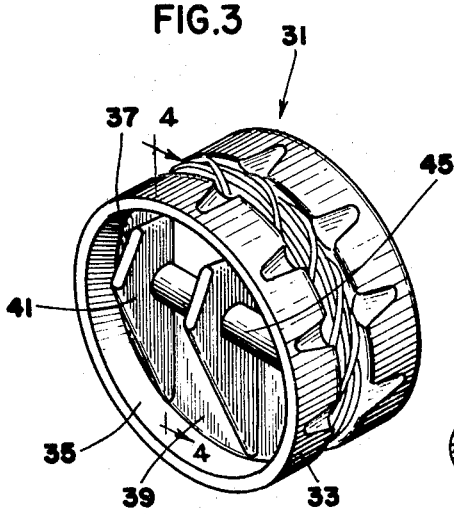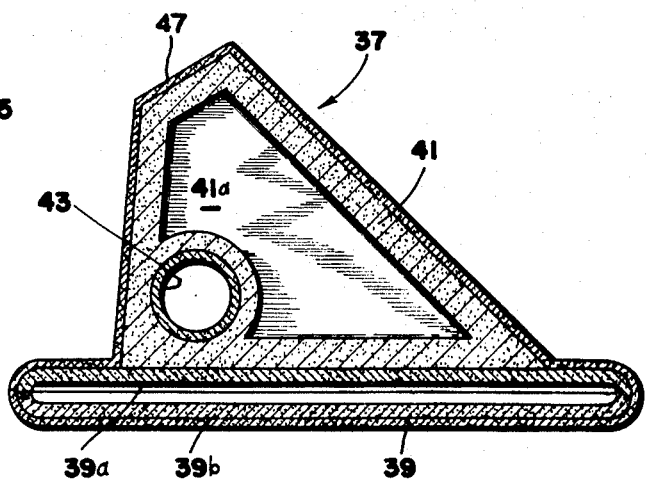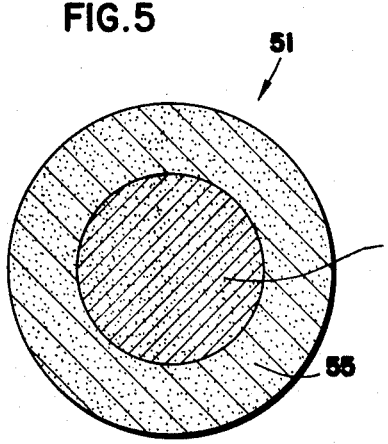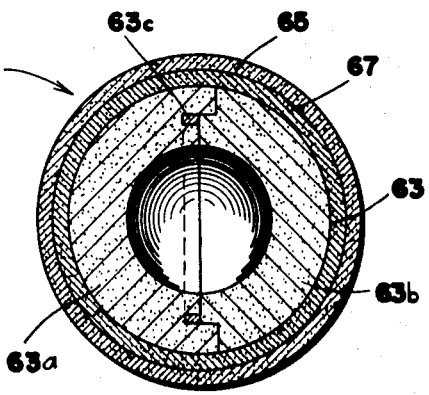
INVENTOR
JACK C. BOKROS

3,579,645
CARDIAC VALVE OCCLUDER HAVING A DENSITY APPROXIMATELY EQUAL TO BLOOD
Jack C. Bokros, San Diego, Calif., assignor to Gulf Energy & Environmental Systems, Inc.
Filed Apr. 30, 1969, Ser. No. 820,361
Int. Cl. A61f 1/22
U.S. Cl. 3—1                 10 Claims

ABSTRACT OF THE DISCLOSURE

An improved movable occluder for intermittently opening and closing the aperture in a heart valve. The occluder has an inner substrate portion and an exterior coating of a material, such as isotropic pyrolytic carbon, that is chemically nonreactive with blood. Although the exterior coating material has a density greater than blood, the substrate has an apparent density less than blood so that the composite occluder has a density that approximates blood. The substrate may be hollow or made of a porous material. An intermediate layer of low density material may be employed to deaden the sound.

---

This invention relates to cardiac valves for insertion into a heart having a defective natural valve, and more particularly to occluders for such cardiac valves.

Several types of heart valves have been used to replace diseased or defective natural heart valves. These valves and the occluders which form a part thereof must be strong enough to survive approximately forty million cycles per year, and they must be wear-resistant and inert to the body chemicals. Although heart valves of various types have been developed, this field may be considered to be in the fairly early stages of development, and improvements in heart valves and the functioning elements thereof is always desired.

One object of the present invention is to provide an improved heart valve. Another object of the invention is to provide an improved occluder for use in a heart valve. A further object is to provide an occluder for a heart valve which provides quick response and improved flow characteristics of the bloodstream through the valve. These and other objects and advantages of the invention will become apparent from the following detailed description when read in connection with the accompanying drawings wherein:

FIG. 1 is a perspective view of a heart valve;
FIG. 2 is an enlarged sectional view taken along the line 2—2 through the occluder of the heart valve shown in FIG. 1;
FIG. 3 is a perspective view of another heart valve;
FIG. 4 is an enlarged sectional view taken generally along line 4—4 through the occluder of the heart valve illustrated in FIG. 3;
FIG. 5 is a view similar to FIG. 2 of an alternate embodiment of the occluder; and
FIG. 6 is a view similar to FIGS. 2 and 5 of another alternative embodiment of an occluder.

Very generally, it has been found that improved occluders for heart valves can be made by coating a suitable substrate with a material that is chemically nonreactive to blood and other body chemicals, one such material being pyrolytic carbon. By properly choosing a substrate of the desired shape and mass so that it has an apparent density less than that of blood, application of an exterior coating of pyrolytic carbon or the like produces an occluder having an overall density substantially equal to the density of blood.

It has been found that if a heart valve is provided with a movable occluder the density of which approximates the density of blood, the valve exhibits an extremely quick response to the forces tending to open and close the valve, and this response is unperturbed by the effects of gravity. The employment of an occluder of this type has been found to result in improved flow characteristics of the bloodstream through the valve, one aspect of which is the lowering of turbulence when compared to occluders previously employed which had a density significantly higher than that of the blood. Particular advantages of the quick response lie in the rapid and smooth closing of the valve which minimizes back flow therethrough, thus aiding the valve in the efficient performance of its intended duty. Moreover, matching the density of the occluder to the density of the blood results in a reduction in damage to the blood cells compared to an occluder of similar design having a density substantially greater than that of blood which reacts with movements that are relatively more abrupt.

Another feature of the composite occluder described above having an exterior coating different in physical characteristics from its interior substrate is that this design facilitates the inclusion of an intermediate layer therebetween of still different composition. Hardness in the surface of an occluder is a characteristic which is consistent with the structural strength and wear-resistance necessary in a movable element of this type. However, the impact of the hard surface of such a movable element against the valve body at the end of its movement, particularly when closing, may create audible noise. As may well be understood, the emanation of audible noise from a valve implanted in the body of a living human being is undesirable. By employing an intermediate or buffer layer of relatively low density material, it is found that a sound-deadening effect is created which significantly reduces the noise of such a hard-surfaced movable occluder.

Illustrated in FIG. 1 is a heart valve 11 of the general type which might be used as a mitral valve between the auricle and the ventricle of a human heart. The valve 11 includes a body portion 13 formed in the general shape of a ring having a central opening or aperture 15 disposed therein. The aperture 15 is intermittently opened and closed by a movable valve member 17 in the shape of a ball or spheroid. The ball 17 is of a size proportioned to seal against an annular seating surface at the center of the ring which generally defines the aperture 15. A cage 19 confines the ball 17 to the immediate vicinity of the valve aperture 15.

As shown in FIG. 2, the ball 17 is a composite, being made of an inner substrate portion 21 and an exterior coating 23. The exterior coating 23 completely surrounds the inner substrate and thus forms the continuous outer surface of the ball 17, which surface will be in contact with the body fluids. It is important that the exterior coating 23 be made of a material that is strong, exhibits good wear-resistance, and is nonthrombogenic. Moreover, to give the uniformity desired, it is considered preferable that the material be capable of being deposited from a vaporous atmosphere to facilitate evenness of coating.

As pointed out in pending U.S. patent application Ser. No. 649,811, filed June 29, 1967, it has been found that pyrolytic carbon having a density of at least about 1.5 grams per cm.³ exhibits the above-mentioned desirable characteristics. Preferably, and particularly for coating substrates having complicated shapes (i.e., those having radii of curvature less than about one quarter of an inch), the pyrolytic carbon should be isotropic rather than having a preferred orientation. The Bacon Anisotropy Factor (BAF) is an accepted measure of preferred orientation of the layer planes in the carbon crystalline structure, and the pyrolytic carbon employed for complicated shapes is desirably fairly highly isotropic having a BAF of not more than about 1.3. For other shapes, pyrolytic carbon having a higher BAF, up to about 2.0 may be used. The technique of measurement and a complete explanation of the scale measurement is set forth in an article by G. E. Bacon entitled "A Method for Determining the Degree of Orientation of Graphite" which appeared in the Journal of Applied Chemistry, volume 6, page 477 (1956). For purposes of explanation, it is noted that 1.0 (the lowest point on the Bacon scale) signifies perfectly isotropic carbon.

In general, the thickness of the outer pyrolytic carbon coating should be sufficient to provide the fracture strengths desired in the resultant composite occluder. Generally, the thickness of the exterior coating 23 should be at least about 100 microns and usually a coating thickness of at least about 250 microns is employed. There is actually no true upper limit to the thickness of the exterior coating 23, and normally the upper limit is dictated by practical reasons. The thicker the exterior coating which is employed, the greater is the length of time that is required in the coating apparatus, correspondingly raising the cost of the coating operation. Consistent with this economic consideration, the thickness of the exterior coating is usually in the range between about 250 microns and 500 microns.

Inasmuch as the density of the pyrolytic carbon deposited is preferably at least about 1.5 grams per cm.$^3$ and may often be in the range of 1.7 to 1.8 grams per cm.$^3$, and may be as high as about 2 grams per cm.$^3$, the apparent density of the substrate 21 before it is coated should be less than the approximate density of blood, if the overall density of the occluder 17 is to match the density of blood. The density of human blood varies somewhat but is considered to be within about 2 percent either way of 1.05 grams/cm.$^3$. By careful workmanship, there is no reason why an occluder cannot be provided having a density substantially equal to 1.05 grams per cm.$^3$. However, the desired effect is believed to be achieved for most purposes if the density of the occluder is substantially equal to or just slightly lower than the density of blood. Numerically, the density of the occluder should be between about 0.97 and 1.07 grams per cm.$^3$.

For example, if it is desired to employ an exterior pyrolytic coating 23 about 500 microns (20 mils) thick as a part of a ball having an outer diameter of about three-quarters of an inch, the substrate 21 to which the 500 micron-thick pyrolytic carbon coating is applied should have an apparent bulk density of about 0.8 gram per cm.$^3$. In other words, a sphere 0.710 inch in outside diameter weighing 2.5 grams should be used as the substrate 21 to be coated.

In the movable ball member 17 illustrated in FIG. 2, the substrate 21 of the desired apparent density is provided by employing a pair of generally hemispherical halves 21a and 21b which are appropriately joined, as by cementing, to form a hollow sphere of the desired outer diameter and mass. The substrate 21 is preferably made of a strong material which, for convenience in fabrication, does not have too high a density, for example, a density in the range of about 2–3 grams per cm.$^3$ is preferred. A strong artificial graphite, such as that commercially available from the Poco Carbon Company of Garland, Tex., is an example of one material that is considered extremely well suited. However, generally, any suitable isotropic material may be employed for the substrate 21, which material retains its strength at the temperatures at which pyrolysis takes place and which is not chemically reactive with the substances which will be employed in the zone of pyrolysis. Also, the coefficient of thermal expansion of the substrate material should be near that of the coating material so that cracking of the coating does not occur during cooling following the high temperature coating operation. Examples of other suitable substrate materials include nongraphitic carbon, tantalum, tungsten, molybdenum, alloys thereof, and refractory materials in general, such as mullite, SiC and $B_4C$.

In instances wherein it is desired that the occluder be balanced, as for example when a ball member 17 is employed as the occluder, manufacture is facilitated if a relatively lower density material, such as graphite (density about 1.5 to 2 grams per cm.$^3$), is used because minor differences in wall thickness will not have any substantial imbalancing effect. On the other hand, if a material such as tantalum (density of about 16.6 grams per cm.$^3$) is employed, the wall thickness of the hollow substrate 21 will be relatively thin so that one mil variation in wall thickness at some location may well put the ball out of balance.

As explained in detail in my copending patent application Ser. No. 764,954, filed Oct. 3, 1968, the composite occluder 17 is provided with excellent strength if the pyrolytic exterior coating is deposited under conditions so that it will be in compression at the temperature at which it will be used, e.g., room temperature or normal body temperatures. This compressive effect in the outer pyrolytic carbon coating is achieved by employing a substrate which has a greater coefficient of thermal expansion than the pyrolytic carbon deposited as the exterior coating. Inasmuch as the pyrolysis to produce the pyrolytic carbon is normally carried out at temperatures of above about 1200° C., if, during the cooling to room temperature, the substrate 21 shrinks a greater amount than the exterior coating 23 and there is a good bond between the substrate and the coating, the resultant exterior pyrolytic carbon coating finds itself under substantial compressive tangential stress at the end of the cooling. To take advantage of this improvement in the structural strength and wearability of the pyrolytic carbon exterior coating 23, substrates 21 are usualy chosen having a coefficient of thermal expansion between about 6 and about $9 \times 10^{-6}/°$ C. Artificial graphite having a coefficient of thermal expansion in the neighborhood of $8 \times 10^{-6}/°$ C. is considered well suited from this standpoint.

A heart valve 31 of different design is illustrated in FIG. 3 to show the applicability of the present invention to the design of nonspherical occluders. This heart valve 31 is described in detail in my copending patent application Ser. No. 719,985, filed Apr. 9, 1968. The heart valve 31 contains a generally short tubular valve body 33 having a central aperture or bore 35 through which the bloodstream flows. An occluded 37 is provided which includes a flat, thin circular disc 39 proportioned to completely close the aperture 35. Attached to the disc 39 is a pair of upstanding fin supports 41 containing a pair of aligned holes 43. The occluder 37 is pivotally mounted in the valve body 33 via a pin 45 which passes through the holes 43 in the fin supports 41. The ends of the pin 45 are seated in the sidewall of the valve body 33. The valve 31 is illustrated with the occluder 37 in the closed position, and it can be seen that when the occulder pivots approximately 75° to the open position, it permits the flow of blood through the aperture 35.

As illustrated in FIG. 4, the disc portion 39 of the occluder 37 is made up of a pair of hollowed out halves 39a and 39b. Likewise, each of the fin supports 41 is made of a pair of halves proportioned so as to provide a hollowed out central portion 41a. After the disc 39 and the individual fin supports 41 have been fabricated, as by cementing or otherwise suitably connecting the halves together, the three pieces are assembled to form the substrate for the occluder 37. The substrate is then coated as a single entity to provide a continuous exterior coating of pyrolytic carbon 47 completely enveloping the entire substrate. The occluder substrate is preferably formed of artificial graphite; however, the materials previously indicated may also be employed. Such a graphite occluder substrate may be coated with pyrolytic carbon in a fluidized bed coating apparatus in the manner discussed in detail hereinafter in the examples.

The occluder 17 and the occluder 37 heretofore illustrated and described, both employ hollow substrates of fairly dense, strong material in order to provide a composite occluder having a density approximately matching that of blood. Illustrated in FIG. 5 is an alternative embodiment of a movable ball occluder 51 including a central substrate section 53 and an exterior layer of chemically nonreactive coating material 55. The substrate 53 is made of a low density material, such as porous carbon (crystalline, but nongraphitic) having a density of about 0.9 gram per cm.$^3$.

The combination of this low density core material 53 and the exterior coating, which has a significantly higher density, is easily proportioned so that the density of the composite overall ball occluder 51 approximately matches that of blood. It is often desirable to apply an exterior coating 55 of a doped pyrolytic carbon when such a porous core is used because the core will not contribute as much to the overall strength of the occluder as will a strong hollow core. Pyrolytic carbon doped with certain additives exhibits superior structural strength to the same pyrolytic carbon without the additives. Thus, the use of the strong layer is particularly advantageous in an occluder because it complements the porous core or substrate. To provide the desired additional strength, the additive should be one which forms a carbide and one which is nonreactive with the body chemicals. The preferred additive is silicon, but other carbide-formers, such as boron, tantalum, zirconium, titanium and the like, might be used for specific applications. For example, isotropic carbon having, as an additive, silicon carbide in an amount up to about 20 weight percent of silicon, based upon total weight of silicon plus carbon, exhibits increased structural strength plus the desired chemical inertness.

Illustrated in FIG. 6 is a ball occluder 61 that is another alternative embodiment to those shown in FIGS. 2 and 5. The ball 61 includes substrate 63 and a surrounding exterior coating 65 of a material which is nonreactive with the body chemicals. The substrate 63 is generally similar to the previously described substrate 21, being formed of a pair of hollow generally hemispherical halves 63a and 63b. The halves 63a and 63b are formed of dense artificial graphite having a density of about 1.85 grams per cm.$^3$ and, instead of being cemented together as with the case of the substrate 21, they are joined by a carburization process.

A circular groove 63c is provided in the mating annular surface of the hemispherical halves 63a. Disposed in this groove is a length of wire of a suitable refractory metal which will react with the carbon to form a stable refractory metal carbide. Zirconium is the preferred refractory metal for this purpose; however, other suitable materials might be used, such as silicon and titanium. With the zirconium metal wire in place in the groove 63c, the substrate halves 63a and 63b are clamped together and slowly heated in a furnace in an inert atmosphere to a temperature of about 2200° C. The zirconium melts and flows into the joint between the two halves 63a and 63b. The heating is carried out at sufficiently rapid rate so that there is melting and flow of the molten metal before substantial carburization occurs. As the temperature stabilizes at about 2200° C., the zirconium metal reacts with the carbon to form zirconium carbide which provides an excellent bond between the two halves 63a and 63b of the substrate.

When the fabrication of the spherical substrate 63 is complete, an intermediate or buffer layer 67 of pyrolytic carbon is deposited upon the outer surface of the substrate 63 to provide the sound-deadening effect discussed hereinbefore. Generally, to perform the desired function of a buffer layer, the material deposited should have a density less than about one-half the theoretical density thereof. Although any material compatible with the intended coating process and with the materials from which the substrate 63 and the exterior coating 65 are formed may be used, low density, spongy, pyrolytic carbon of the type which is deposited from high partial pressures of acetylene is employed. Generally, the buffer layer should be at least about 25 microns thick, and an example of a suitable buffer layer that may be employed for this purpose is a 25 micron thick layer of spongy pyrolytic carbon having a density between about 0.9 and 1 gram per cm.$^3$.

The outer layer 65 of dense isotropic pyrolytic carbon is applied directly atop the intermediate or buffer layer 67. It has been found that the ball occluder 61, including the intermediate buffer layer 67, in operation in a valve, such as the valve 11, creates less sound than a similar ball occluder without the buffer layer. Accordingly, if such a similar occluder 61, except for the omission of the intermediate layer of buffer material 67 is employed, it might be used with a valve body 13 having a cloth-covered valve seat and/or cage 19.

The following examples show two illustrative processes for making ball-type occluders of the type described hereinbefore. Both examples employ the generally preferred method of depositing isotropic carbon at temperatures below about 1500° C. to provide the exterior coating. It should be understod however that, when employing a pyrolytic deposition process, it is generally not substantially more difficult to deposit either laminar carbon or higher temperature isotropic carbon, than to deposit isotropic carbons at these temperatures. Because such lower temperature isotropic carbons can be deposited having the desired physical characteristics, they are generally employed because they have somewhat greater strength and somewhat greater wearability. However, isotropic carbon deposited at tempeatures above about 1500° C., as from methane or propane or some other hydrocarbon, might also be employed. Likewise, laminar carbon, deposited from methane at temperatures below 1500° C. can be deposited having a density of about 1.5 grams per cm.$^3$ or higher and may adequately be used.

EXAMPLE I

A hollow sphere is made from two halves of graphite having a coefficient of thermal expansion of about $8 \times 10^{-6}/°$ C. The sphere is 0.710 inch in outer diameter, and has a wall thickness of about 0.08 inch. The sphere is lightly sandblasted to remove any loose particles and is then found to have a mass of about 2.5 grams.

The sandblasted sphere is suspended in a vertical graphite reaction tube about 3.6 centimeters in diameter. The sphere, plus an ancillary charge of 100 grams of zirconium dioxide particles having an average particle size of about 300 microns (to provide additional available deposition surface area as explained in U.S. Patent 3,399,969) are heated to a temperature of about 1300° C. while a flow of helium gas is maintained upward through the tube. Propane gas is admixed with the helium to provide a partial pressure of propane of about 0.4 atm. (total pressure of 1 atm.). The total flow of propane plus helium is held at about 8000 cc. per minute. The propane undergoes pyrolysis and deposits carbon on the sphere in the form of isotropic pyrolytic carbon having a coefficient of thermal expansion of about $5 \times 10^{-6}/$ C. Subsequent examination also shows the carbon has a BAF of about 1.1, an apparent crystallite size of about 40 A. and a density of about 1.9 grams per cm.$^3$. Deposition is continued until an isotropic pyrolytic carbon coating about 20 mils (500 microns) thick is obtained, a time of about an hour.

The resultant coated sphere is allowed to cool to ambient temperature and is removed from the reaction tube. The change in temperature of nearly 1400° C. between the deposition temperature and ambient temperature effects a sufficiently greater contraction of the graphite substrate than of the isotropic carbon coating to set up a circumferential compressive stress in the coating of about 6,000 p.s.i., giving it excellent structural strength.

The resultant coated sphere has a mass of about 3.8 grams and an outer diameter of 0.75 inch, the density thus being about 1.05 grams/cm.$^3$. Tests show the isotropic pyrolytic carbon is chemically nonreactive with the chemicals of the human body and is nonthrombogenic. Testing of the coated sphere as an occluder in a heart valve of the ball-type shows that it exhibits improved liquid flow characteristics. Continued testing shows the coated sphere exhibits excellent wear-resistance. It is considered well-suited for use in a heart valve.

EXAMPLE II

A graphite sphere made out of turbostratic carbon having a density of 0.8 gram/cm.$^3$ and an outer diameter of 0.71 inch is introduced into the same reaction tube which was used in Example I. The sphere plus a similar ancillary charge of 100 grams of $ZrO_2$ particles are heated to a temperature of about 1350° C. while maintaining an upward flow of helium gas through the tube. When coating is ready to begin, propane gas is admixed with the helium to provide a total gas flow of about 8000 cc. per minute, having a partial pressure of propane of about 0.4 atm. (total pressure of 1 atm.). All of the helium is bubbled through methyltrichlorosilane. The propane and the methyltrichlorosilane pyrolyze to deposit a mixture of isotropic carbon and silicon carbide on the sphere. Deposition is continued until a coating about 20 mils (500 microns) thick is obtained, a time of about one hour.

The resultant coated sphere is allowed to cool to ambient temperature and is removed from the reaction tube. Examination of the isotropic carbon-silicon carbide coated sphere shows it has a mass of 3.8 grams and an outer diameter of 0.75 inch, thus having a density of about 1.05 grams per cm.$^3$. The coating contains about 10 weight percent silicon, in the form of silicon carbide. The isotropic carbon has a BAF of about 1.1 and an apparent crystallite size of about 35 A.

The resultant coated sphere is considered to have good structural strength, and it is nonreactive to the chemicals of the body and is nonthrombogenic. Testing of the coated sphere in a heart valve shows that the valve exhibits improved liquid flow characteristics over a similar ball having a density equal to that of silicon rubber, which has previously been used in such valves. The coated sphere also showed very good wear-resistance over use for an extended period. The isotropic carbon-silicon carbide coated sphere is considered to be well-suited for use in a heart valve.

Various modifications and alternative embodiments of the present invention will be suggested to those having skill in the art and are intended to be within the spirit and scope of the present invention.

Various of the features of the present invention are set forth in the following claims.

What is claimed is:
1. For use in a heart valve having a valve body formed with an aperture therein for the passage of blood therethrough, a movable occluder for intermittently opening and closing said aperture, which movable occluder has an inner substrate portion and an exterior coating of a material that is chemically nonreactive with blood, said exterior coating being made of material having a density greater than blood and said substrate having an overall density less than the density of blood so that said occluder has a density between about 0.97 and 1.07 grams per cm.$^3$.

2. An occluder in accordance with claim 1 wherein said exterior coating is formed of pyrolytic carbon having a density of at least about 1.5 grams per cm.$^3$.

3. An occluder in accordance with claim 2 wherein said pyropytic carbon is isotropic carbon having a BAF of not greater than about 1.3.

4. An occluder in accordance with claim 3 wherein said exterior coating is at least about 100 microns thick.

5. An occluder in accordance with claim 1 wherein said exterior coating is formed of pyrolytic carbon doped with silicon carbide, said silicon being present in an amount up to about 20 weight percent, based upon total weight of carbon plus silicon.

6. An occluder in accordance with claim 1 wherein said inner substrate is hollow.

7. An occluder in accordance with claim 6 having a low density layer disposed between said substrate and said exterior coating.

8. An occluder in accordance with claim 7 wherein said low density layer is pyrolytic carbon having a density of not greater than about 1 gram per cm.$^3$ and a thickness of at least about 25 microns.

9. An occluder in accordance with claim 1 wherein said substrate is made of porous graphite.

10. An occluder in accordance with claim 9 wherein said exterior coating is isotropic pyrolytic carbon having a thickness of at least about 100 microns.

References Cited

UNITED STATES PATENTS

| 3,298,921 | 1/1967 | Bokros et al. | 117—46X |
| 3,317,338 | 5/1967 | Batchelor | 117—46 |

FOREIGN PATENTS

| 1,500,461 | 9/1967 | France. | |

OTHER REFERENCES

"Aortic Valve Prosthesis Incorporating Lightweight Titanium Ball, Dacron Velour Covered Cage and Seat" by D. A. Cooley et al., Transactions American Society for Artificial Internal Organs, vol. XIII, 1967, pp. 93–100.

RICHARD A. GAUDET, Primary Examiner

R. L. FRINKS, Assistant Examiner

U.S. Cl. X.R.

23—209.1, 209.2; 117—46